(12) United States Patent
Tazarine et al.

(10) Patent No.: US 10,179,557 B2
(45) Date of Patent: Jan. 15, 2019

(54) MULTI-VOLTAGE ON-BOARD ELECTRICAL SYSTEM AND MULTILAYER CABLE FOR DIFFERENT VOLTAGE LEVELS

(71) Applicant: Auto-Kabel Management GmbH, Hausen i.W. (DE)

(72) Inventors: Wacim Tazarine, Erkelenz (DE); Sohejl Rafati, Mönchengladbach (DE); Frank Gronwald, Bedburg (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 15/771,568

(22) PCT Filed: Sep. 9, 2016

(86) PCT No.: PCT/EP2016/071271
§ 371 (c)(1),
(2) Date: Apr. 27, 2018

(87) PCT Pub. No.: WO2017/076535
PCT Pub. Date: May 11, 2017

(65) Prior Publication Data
US 2018/0345886 A1 Dec. 6, 2018

(30) Foreign Application Priority Data
Nov. 4, 2015 (DE) .................. 10 2015 118 921

(51) Int. Cl.
*B60L 1/00* (2006.01)
*H02G 3/00* (2006.01)
(Continued)

(52) U.S. Cl.
CPC ............ *B60R 16/03* (2013.01); *B60L 3/0069* (2013.01); *B60L 11/005* (2013.01); *B60L 11/14* (2013.01);
(Continued)

(58) Field of Classification Search
USPC ........................................................ 307/10.1
See application file for complete search history.

(56) References Cited

U.S. PATENT DOCUMENTS

2008/0128153 A1    6/2008   Lietz

FOREIGN PATENT DOCUMENTS

DE            44 41 268 A1      5/1996
DE      10 2012 200 979 A1      7/2013
(Continued)

OTHER PUBLICATIONS

German Patent and Trademark Office, Office Action—Application No. 10 2015 118 921.6, dated Oct. 11, 2016, 6 pages (in German).
International Searching Authority, International Search Report—International Application No. PCT/EP2016/071271, dated Dec. 6, 2016, together with the Written Opinion of the International Searching Authority, 14 pages (in German).
(Continued)

*Primary Examiner* — Rexford Barnie
*Assistant Examiner* — Dru Parries
(74) *Attorney, Agent, or Firm* — Sunstein Kann Murphy & Timbers LLP

(57) ABSTRACT

Multi-voltage on-board electrical system of a motor vehicle, comprising at least three flat cables extending substantially in parallel with one another in the longitudinal direction thereof, and at least two voltage sources, wherein a first of the flat cables is connected in an electrically conductive manner to a first pole of a first of the voltage sources, a second of the flat cables is connected in an electrically conductive manner to a first pole of a second of the voltage sources, and a third of the flat cables arranged between the first and the second flat cable is connected in an electrically conductive manner to a second pole of the first and/or second voltage source.

20 Claims, 7 Drawing Sheets

Figure 1:
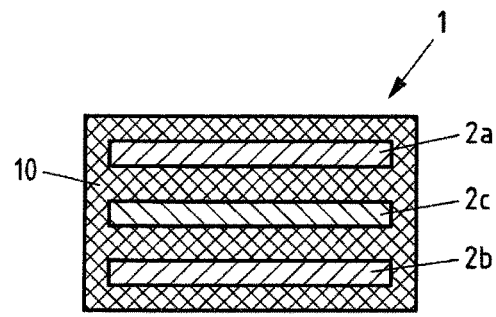

(51) Int. Cl.
*B60R 16/03* (2006.01)
*B60L 11/00* (2006.01)
*B60L 11/14* (2006.01)
*B60L 11/18* (2006.01)
*B60L 3/00* (2006.01)
*H02J 1/00* (2006.01)
*H02J 7/14* (2006.01)
*H01B 7/08* (2006.01)

(52) U.S. Cl.
CPC .............. *B60L 11/1805* (2013.01); *H02J 1/00* (2013.01); *H02J 7/1423* (2013.01); *B60L 2210/10* (2013.01); *B60L 2240/527* (2013.01); *B60L 2240/547* (2013.01); *B60L 2270/147* (2013.01); *H01B 7/0823* (2013.01); *H02J 2001/008* (2013.01)

(56) References Cited

FOREIGN PATENT DOCUMENTS

| | | |
|---|---|---|
| DE | 10 2013 016 073 A1 | 4/2015 |
| JP | 2010-244838 A | 10/2010 |
| JP | 2011-113928 A | 6/2011 |
| JP | 2011-146237 A | 7/2011 |
| JP | 2011-150849 A | 8/2011 |
| WO | WO 2006/082238 A1 | 8/2006 |
| WO | WO 2014/076476 A1 | 5/2014 |

OTHER PUBLICATIONS

International Preliminary Examining Authority, International Preliminary Report on Patentability—International Application No. PCT/EP2016/071271, dated Jan. 31, 2018, 11 pages (In German).

MULTI-VOLTAGE ON-BOARD ELECTRICAL SYSTEM AND MULTILAYER CABLE FOR DIFFERENT VOLTAGE LEVELS

The application relates to a multi-voltage on-board electrical system for motor vehicles and a multilayer cable for different voltage levels for use in multi-voltage on-board electrical systems of motor vehicles.

Due to the constantly increasing demands for fuel efficiency, comfort and reliability in modern automotive technology, the conventional 12 V motor vehicle on-board electrical system is no longer up-to-date. The constant increase in the number of electrical consumers, the ongoing demand for weight reduction and the guarantee of a reliable and long-term energy supply can no longer be achieved by the 12 V motor vehicle on-board electrical system.

This problem can be solved by the addition of at least one further voltage level, 48 V for example. By increasing the system voltage, the efficiency of the power distribution in the vehicle is fundamentally improved due to the reduced current and thus reduced ohmic losses. Thus, modern multi-voltage on-board electrical systems for motor vehicles are designed in such a way that the 12 V voltage level only supplies consumers that need little power, whereas the 48 V voltage level supplies all motor vehicle consumers that need a lot of power in a short amount of time.

Admittedly, the addition of the 48 V voltage level also has certain disadvantages. There is a risk of short circuit between the 48 V and 12 V voltage levels, which can lead to the destruction of all consumers of the motor vehicle designed only for the 12 V voltage level. In addition, in contrast to 12 V voltages, at a voltage of 48 V stable arcs occur, which as well as a short circuit can also cause a vehicle fire due to local overheating. Consequently, the use of multi-voltage on-board electrical systems for motor vehicles with higher voltage levels requires extremely costly measures to reduce the risk of fire. A further disadvantage in relation to the addition of the 48 V voltage level is the increase of electromagnetic couplings in the motor vehicle on-board electrical system, which leads to a decrease in electromagnetic compatibility. This is a major security problem, in particular where high quality standards are placed on data transmission. In order to overcome these problems connected to the introduction of a multi-voltage on-board electrical system, high demands are placed on the structure of the motor vehicle on-board electrical system as well as on the energy and signal cable used.

Therefore, the object of the subject matter is to provide a multi-voltage on-board electrical system for motor vehicles that minimises the likelihood of the occurrence of short circuits between the different voltage levels of the motor vehicle on-board electrical system as well as the occurrence of arcs taking into account the electromagnetic compatibility of the motor vehicle on-board electrical system.

To achieve this object, a multi-voltage on-board electrical system for motor vehicles comprising at least three flat cables extending substantially in parallel with one another in the longitudinal direction thereof and at least two voltage sources is proposed, wherein a first of the flat cables is connected in an electrically conductive manner to a first pole of a first of the voltage sources, a second of the flat cables is connected in an electrically conductive manner to a first pole of a second of the voltage sources, and a third of the flat cables is connected in an electrically conductive manner to a second pole of the first and/or second voltage source and characterised in that the third flat cable is arranged between at least the first and the second flat cable.

Due to the known material technical advantages in relation to the round cables originally used as energy conductors in the automotive industry, flat cables made of solid material are used in the represented multi-voltage on-board electrical system. Thereby, the flat cables according to the subject matter are designed in one piece have a minimum layer thickness of 1.5 mm, preferably a minimum layer thickness of 5 mm, in particular a minimum layer thickness of above 5 mm. By flat cables, so-called foil conductors are thus not meant.

The flat cables made of solid material used have a lower height and thus a lower weight and a lower space requirement than round cables. With the same current-carrying capacity, flat cables are, corresponding to their favourable ratio of surface area to volume and the associated better heat emission, clearly much better suited for energy transmission than round cables. In view of the lower amount of installation effort required as well as a lower error rate in relation to the installation and connection of individual cables, it is advantageous to combine flat cables with multilayer cables. The use of multilayer cables made of flat cables is particularly suited to multi-voltage on-board electrical systems for motor vehicles, as for each voltage level an individual power line must be routed through the vehicle body.

The electrical connection between the flat cables and the voltage sources or between individual flat cables is preferably formed via separable connections such as clamps, plug connectors or cable lugs, but can also be formed inseparably.

Batteries, condensers, generators transformers or even fuel cells can be used as voltage sources. Preferably, batteries are used, in particular lead-acid batteries, li-ion batteries, zinc-air batteries or aluminium-air batteries.

It is proposed that the first of the flat cables taps a higher electrical potential difference via the poles of a first of the voltage sources than the second of the flat cables does via the poles of a second of the voltage sources. Preferably, a first of the flat cables taps an electrical potential difference of 24 V, particularly preferably of 48 V, while a second of the flat cables preferably taps an electrical potential difference of 12 V. A voltage level of 12 V carried via flat cables of the motor vehicle on-board electrical system can ideally be used to supply voltage of vehicle consumers with a low power requirement. On the other hand, due to the significantly higher efficiency, when inverting, a voltage level of 48 V carried via flat cables of the motor vehicle on-board electrical system can ideally be used to supply vehicle consumers with a high power requirement for a short amount of time, such as the starter, or energy efficiency systems such as brake energy recovery, start-stop systems, roll stabilisers or hybrid systems.

It should be noted that in the following the term electrical voltage, which can be tapped between the two poles of a voltage source, is used to mean electrical potential difference.

Due to the lower cabling effort required and the substantial weight reduction, in modern motor vehicle on-board electrical systems the vehicle body is commonly used as a ground return. However, in the present case it is proposed not to use the vehicle body, but a separate flat cable as a ground return. Here it is proposed to return the ground via a third flat cable, which is arranged between the first and second flat cable. By means of this type of ground return, not only is the capacitive and inductive coupling minimised and thus the electromagnetic compatibility (EMC) of the motor vehicle on-board electrical system is improved, but the likelihood of a short circuit between the different voltage levels of the motor vehicle on-board electrical system is also minimised. In addition, in case of a short circuit of the first or second flat cable, quick and simple short circuit detection is possible with the ground return third flat cable.

Ground return via a separate flat cable is particularly suited to application is motor vehicles with vehicle bodies that are not electrically conductive, such as fibre-reinforced vehicle bodies.

In order to minimise the galvanic coupling between the two voltage levels when arranging a combined ground return, it is proposed that a larger cable cross section is applied for the ground return third flat cable arranged between the first and second flat cable than for at least two of the further flat cables in the cable. Alternatively to a combined ground return, a more efficient reduction of the galvanic coupling between the two voltage levels can be achieved by means of a separate ground return. In this case, the two ground return flat cables can either be arranged next to each other between the two flat cables carrying the different on-board electrical system voltages of the motor vehicles, or arranged alternately.

In order to make optimal use of the energy efficiency of the 48 V voltage level, it is proposed that a DC-DC converter is integrated into the motor vehicle on-board electrical system. This can transform the 48 V DC current to 12 V DC current and thus also make the electrical power of the 48 V network available to the motor vehicle consumers of the 12 V voltage level.

Furthermore, it is proposed that in addition to the first flat cable, the second flat cable and the third flat cable, at least one further flat cable is arranged connected in an electrically conductive manner to the first pole of a third voltage source and/or a further flat cable is arranged connected in an electrically conductive manner to the second pole of the first and/or second and/or third voltage source. In the case of an arrangement of three voltage sources, preferably an arrangement of at least five flat cables would be conceivable so that all three flat cables tapping an electrical voltage are separated from each other by means of ground return flat cables and carried in one cable.

Regarding an arrangement with three voltage sources, it is proposed that a different potential difference can be tapped via the pole of the first voltage source than via the pole of the second voltage source and/or via the pole of the third voltage source, in particular that a different potential difference can be tapped via the poles of all three voltage sources. In addition to a 48 V voltage level and a 12 V voltage level, a high voltage level, e.g. a 100 V level is also conceivable. Likewise, a further voltage level between the 48 V and the 12 V levels, for example a 24 V level would also be conceivable. A multi-voltage on-board electrical system for motor vehicles with three voltage levels in which the same electrical voltage can be tapped via two or three voltage sources would also be possible.

For a better understanding, it should be pointed out that in this instance the term high voltage level is used to designate a voltage level that taps a potential difference of >48 V. By contrast, the term low voltage level is used to designate a voltage level that taps a potential difference of up to and including 12 V. Finally, the voltage level between the voltage level of >12 V and >48 V is here designated as a medium voltage level. Accordingly, in the following motor vehicle consumers that have low power consumption and are preferably supplied with electrical voltage via the low voltage level are designated as low-voltage consumers (LV), while all motor vehicle consumers—with the exception of an electric motor of an electric or hybrid vehicle—that need a lot of power in a short amount of time are preferably supplied with electrical voltage by the medium voltage level and are therefore designated as medium-voltage consumers (MV). Due to the high expense of establishing a contact protection, an electric motor (EM) of an electric or hybrid vehicle is preferably supplied with electrical voltage or a brake energy recovery is connected via the high-voltage level of >48 V.

A further aspect is a multilayer cable for different voltage levels for application in multi-voltage on-board electrical systems of motor vehicles comprising at least three flat cables extending substantially in parallel with one another in the longitudinal direction thereof, wherein a first of the flat cables is connected in an electrically conductive manner to a first pole of a first voltage source, a second of the flat cables is connected in an electrically conductive manner to a first pole of a second voltage source, and a third of the flat cables is connected in an electrically conductive manner to a second pole of the first and/or second voltage source and characterised in that the third flat cable is arranged between at least the first and the second flat cable.

In order to enable a simple installation of the multilayer cable in the motor vehicle, the multilayer cable can preferably be formed in a bending-resistant manner. Bending resistance can be understood as a stiffness in which a force greater than the weight force is necessary in order to induce plastic deformation.

Regarding the material of the flat cables, it is proposed that at least one of the flat cables is at least partially formed of an aluminium material, from aluminium or an alloy therefor and/or that at least one of the flat cables is at least partially formed of a copper material, of copper or an alloy thereof. Therein, a material selection for the flat cables can be made depending on the current to be carried via the flat cables. For example, a flat cable that is provided for the voltage supply of vehicle consumers that need a lot of power in a short amount of time, can be at least partially formed from a very good electrical conductor and heat conductor, such as a copper material. By contrast, if a flat cable is provided for the voltage supply of electrical consumers with a low power requirement it can thus preferably be formed from an aluminium material due to weight and cost savings. Furthermore, a material selection for the flat cables can also be made depending on the connection of the flat cables to the voltage sources or the flat cables to each other. Due to good deformability, a copper material is well suited when using separable connections, such as clamps, plug connectors or cable lugs. An aluminium material has the disadvantage that it can be deformed at high temperatures and thus loose connections can occur on the joints. In order to avoid the formation of a stable arc, it is therefore proposed that a copper material is used, in particular for flat cables connected to a higher electrical connection of 48 V or high voltage.

Due to the known material technical advantages in relation to the shape of the flat cables, it is proposed that at least one of the flat cables has a substantially rectangular cross section, the height of which is less that its width. It is proposed that the height is less than 3 mm, preferably less than 2.5 mm and that the ratio of height to width of at least one of the flat cables is between 1:2 and 1:15, in particular between 1:5 and 1:10.

Due to the nature of propagation of the electric field over the flat cable, high field strengths occur in particular at the corners and edges of the flat cables, which can lead to flashovers. Therefore, in order to prevent electrical flashovers between the voltage flat cables, it is proposed that the edges and/or corners of the flat cables can be rounded. Thus, a minimum radius of 1 mm is proposed, preferably a minimum radius of 2.5 mm, in particular a minimum radius of above 2.5 mm.

To further prevent electrical flashovers between the flat cables, a minimum distance between the flat cables is provided. In addition to the electrical voltage tapped via the flat cables, the minimum distance depends on the type and layer thickness of the insulation between the flat cables. A minimum distance between the flat cables of at least 0.2 mm, preferably 1 mm, is proposed.

Depending on the connected consumers, it may be necessary to conduct high currents via the flat cables of the motor vehicle on-board electrical system for a short amount of time. In particular the starter or systems such as brake energy recovery, start-stop systems, roll stabilisers or hybrid systems need a lot of power in a short amount of time. Although these systems are favourably supplied by the 48 V voltage level, which means that in contrast to the 12 V voltage level, with the same current, four times the power is achieved, and consequently the requirements of the current-carrying capacity of the flat cable fall; however, depending on the amount of systems to be supplied at the same times, a high current-carrying capacity of the flat cables is still desirable. Therefore, it is proposed that the current-carrying capacity of at least one of the flat cables is at least 50 amps, preferably 100 amps.

In order to save weight, it is advantageous only to apply large cable cross section to those cables that must also carry a large current. Therefore, it is proposed that at least one of the flat cables has a greater cable cross section than at least two of the further flat cables.

In order to prevent short circuits or arcs between directly adjacent flat cables, it is provided that at least one insulation is arranged between the flat cables. Alternatively, two or more insulations made of the same or different insulation materials can also be arranged between two directly adjacent flat cables. It is conceivable that at least one of the flat cables is coated with a further insulation layer in addition to the insulation arranged between the flat cables. Preferably, all flat cables can additionally be coated with a further insulation layer.

A suitable insulation material can thus be formed of a plastic. The plastic can preferably be an elastomer, particularly preferably a thermoplastic material. The thermoplastic material can be a thermoplastic standard material, preferably a thermoplastic construction material, in particular a thermoplastic high-performance material.

For easy installation of the multilayer cable in the motor vehicle, it is advantageous if this is formed as pliably and flexibly as possible. Therefore, in this case it is proposed that the insulation surrounding the flat cables is formed from a flexible, bending-resistant insulation material, wherein the bending resistance thereof, in accordance with DIN EN ISO 178, is at least 20 MPa, preferably more than 40 MPa, more preferably more than 60 MPa.

As, particularly in flat cables that transmit a high current, high temperatures are quickly generated, it is necessary to design the insulation material used for at least correspondingly high temperatures. It is therefore proposed that an insulation surrounding at least one of the flat cables is formed from a temperature-stable insulation material, wherein the permissible temperature range thereof extends from −10° C. to +80° C., preferably from −20° C. to +120° C., more preferably from below −20° C. to over 120° C. In particular, a permissible temperature range can extend from −40° C. to +120° C. Preferably, more than one, particularly preferably all insulations are formed from a corresponding temperature-stable insulation material.

A fundamentally necessary requirement for a suitable insulation material is the specific electrical conductivity thereof, depending on the area of requirement. Here it is proposed that an insulation surrounding at least one of the flat cables is formed of a non-conductive insulation material, wherein the specific electrical conductivity thereof is at least less than $10^{-5}$ S·cm$^{-1}$, preferably less than $10^{-10}$ S·cm$^{-1}$, particularly preferably less than $10^{-15}$ S·cm$^{-1}$. Preferably more than one, particularly preferably all insulations are formed from a non-conductive insulation material.

In addition to a low specific electrical conductivity, a suitable insulation material for preventing the formation of stable arcs advantageously has a high dielectric strength. In particular, the flat cable that is connected in an electrically conductive manner to the 48 V voltage source or even to a high voltage source, requires a corresponding insulation formed from a breakdown-resistant insulation material, as stable burning arcs only form from a voltage of approx. 18 V. Therefore, it is proposed that an insulation surrounding at least one of the flat cables is formed of a breakdown-resistant insulation material, wherein the breakdown resistance thereof is at least more than 5 kV/mm, preferably more than 20 kV/mm, particularly preferably more than 50 kV/mm. Preferably, more than one, particularly preferably all insulations are formed from a breakdown-resistant insulation material. It is also conceivable that not only the insulation material, but also the layer thickness of the insulation material is selected depending on the flat cable to be insulated. Preferably, the flat cable that is connected in an electrically conductive manner to the 48 V voltage source or even to a high voltage source is insulated with a larger layer thickness of the insulation material than at least two of the other flat cables.

Particular attention must be paid to prevent the risk of short circuits in multi-voltage on-board electrical systems for motor vehicles. In order to avoid a negative influence of moisture on the motor vehicle on-board electrical system as effectively as possible, an insulation material is preferably used that is resistant to hydrolysis and/or only absorbs small amounts of water. Thus, it is proposed that an insulation surrounding at least one of the flat cables is formed from an insulation material having a water absorbency within 24 hours at 23° C., in accordance with DIN EN ISO 62, of less than 0.07%, preferably of less than 0.03%, particularly preferably of less than 0.01%. Preferably, more than one, particularly preferably all insulations are formed having a correspondingly low water absorbency.

Also relevant to a suitable insulation material is the tracking resistance thereof, which is closely connected to the water absorbency of the insulation material. Even with insulation that is intact from the inside, water leakage of the insulation material causes leakage currents over the outer surface of the cable. It is therefore proposed that an insulation surrounding at least one of the flat cables is formed from an insulation material having a tracking resistance according to a CTI value of greater than 50 V, preferably greater than 200 V, particularly preferably greater than 400 V. Preferably, more than one, particularly preferably all insulations are formed having a correspondingly high tracking resistance.

In order to ensure simple cabling of the multilayer cable with the consumers of the motor vehicle on-board electrical system, at least one tap of one of the flat cables, preferably a plurality of taps of one or a plurality of flat cables can be led out of the insulation material.

Advantageously, at least one data transmission cable can be arranged in the multilayer cable in addition to the flat cables. This can be formed as a twisted-pair cable, as a coaxial cable or as a fibre optic cable and to improve the electromagnetic compatibility of the motor vehicle on-board electrical system can additionally have a shield in the form of a metal foil, a metal strip, a metal braid or a metal coating.

To further improve the electromagnetic compatibility of the motor vehicle on-board electrical system, it is proposed that additionally at least one of the flat cables is encased by a shield in the form of a metal foil, a metal strip, a metal braid or a metal coating. Preferably, more than one, particularly preferably all insulations are additionally encased by a shield in the form of a metal foil, a metal strip, a metal braid or a metal coating.

Figure 2:
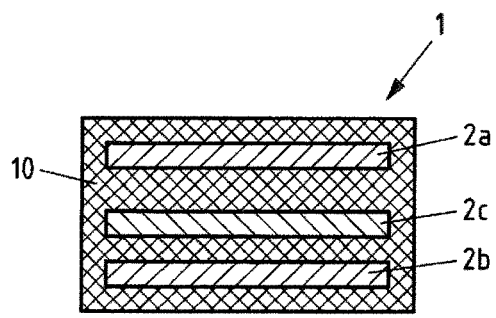
Figure 3:
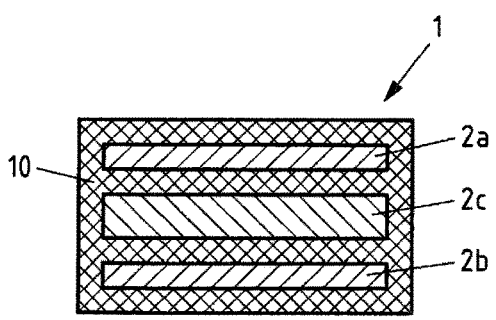
Figure 4:
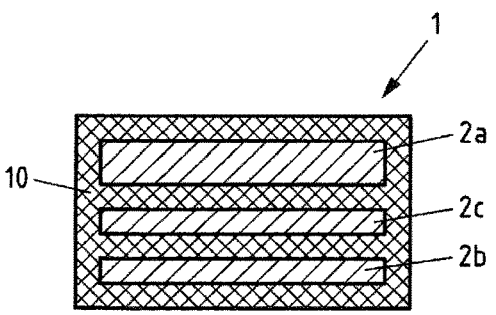
Figure 5:
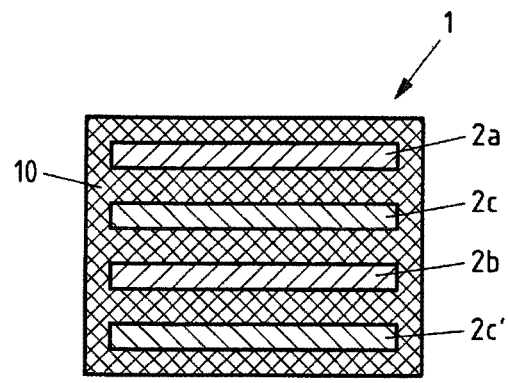
Figure 6:
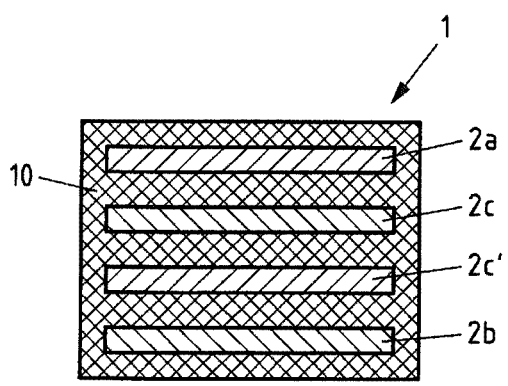
Figure 7:
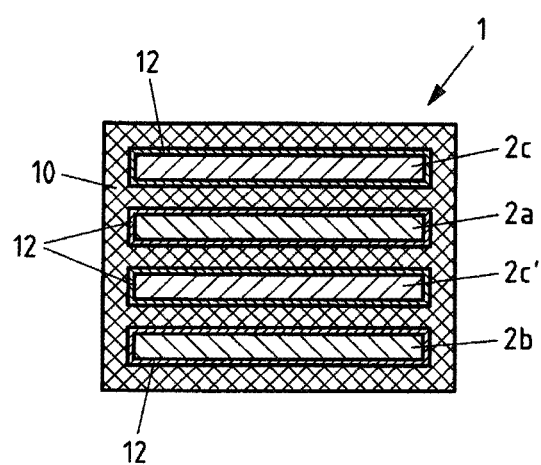
Figure 8:
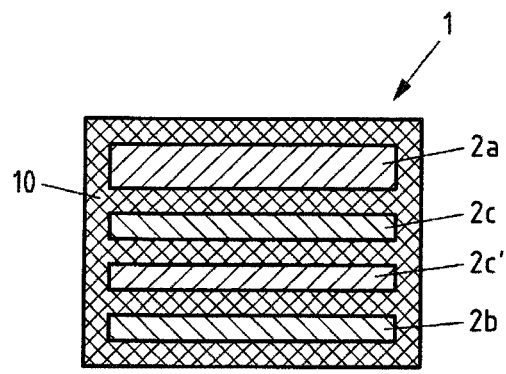
Figure 9:
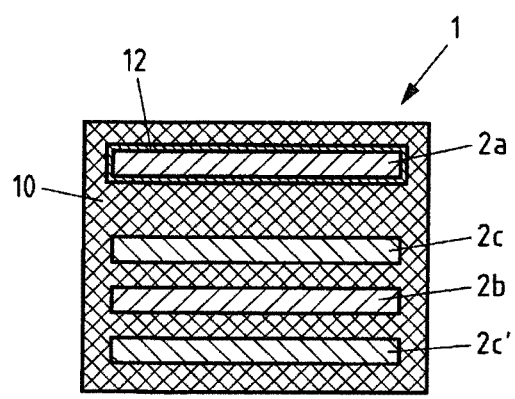
Figure 10:
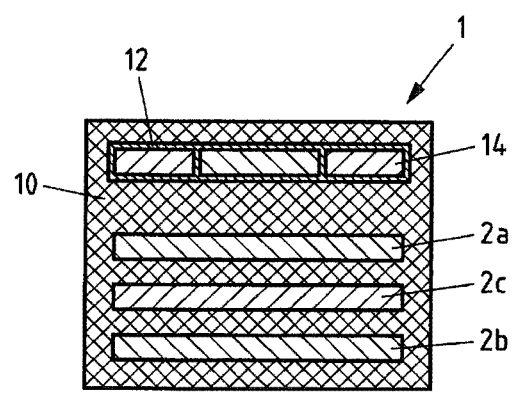
Figure 11:
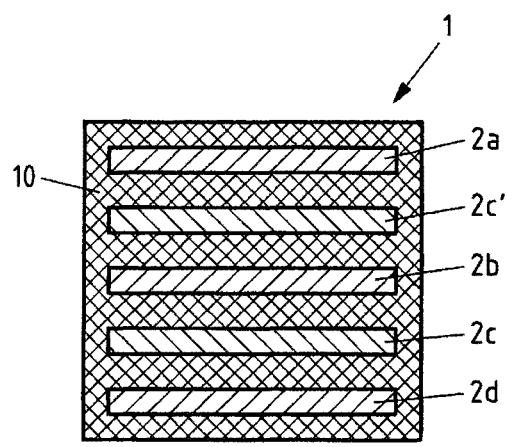
Figure 12:
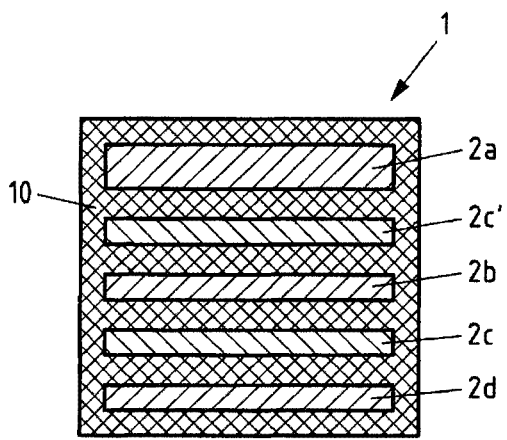
Figure 13:
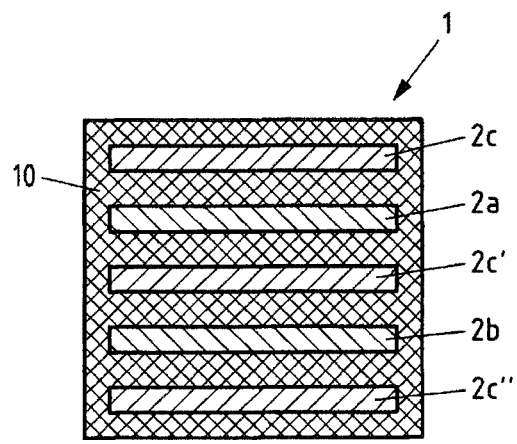
Figure 14:
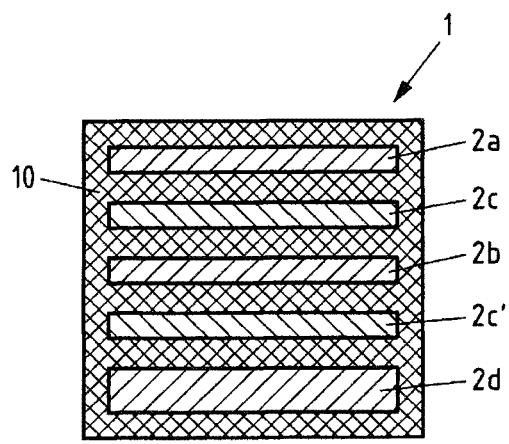
Figure 15:
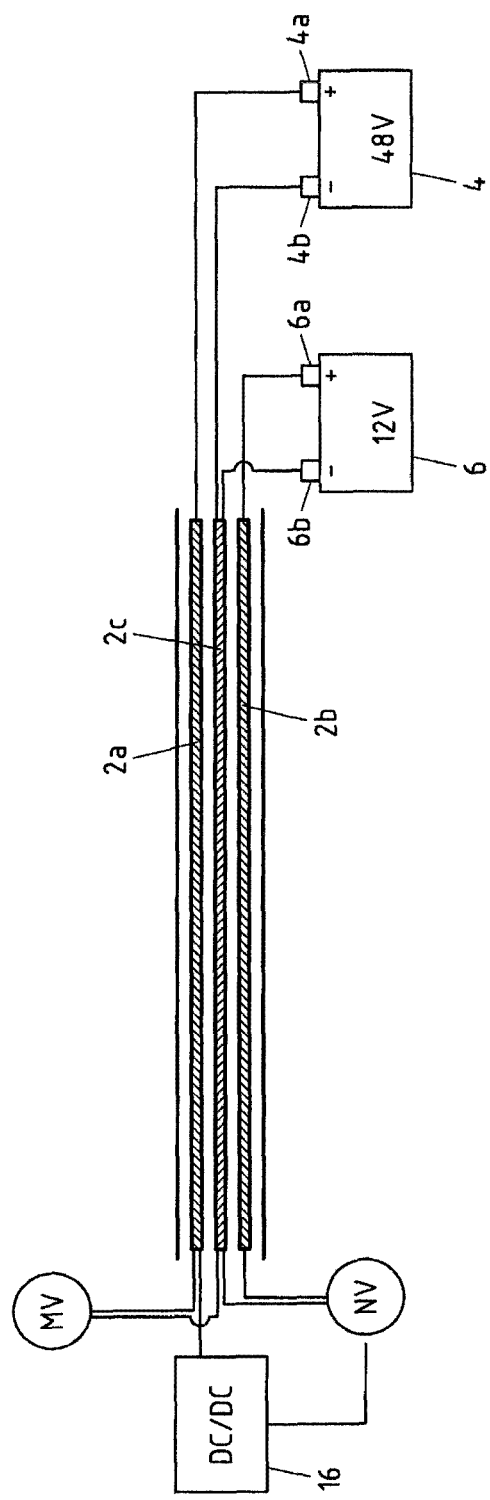
Figure 16:
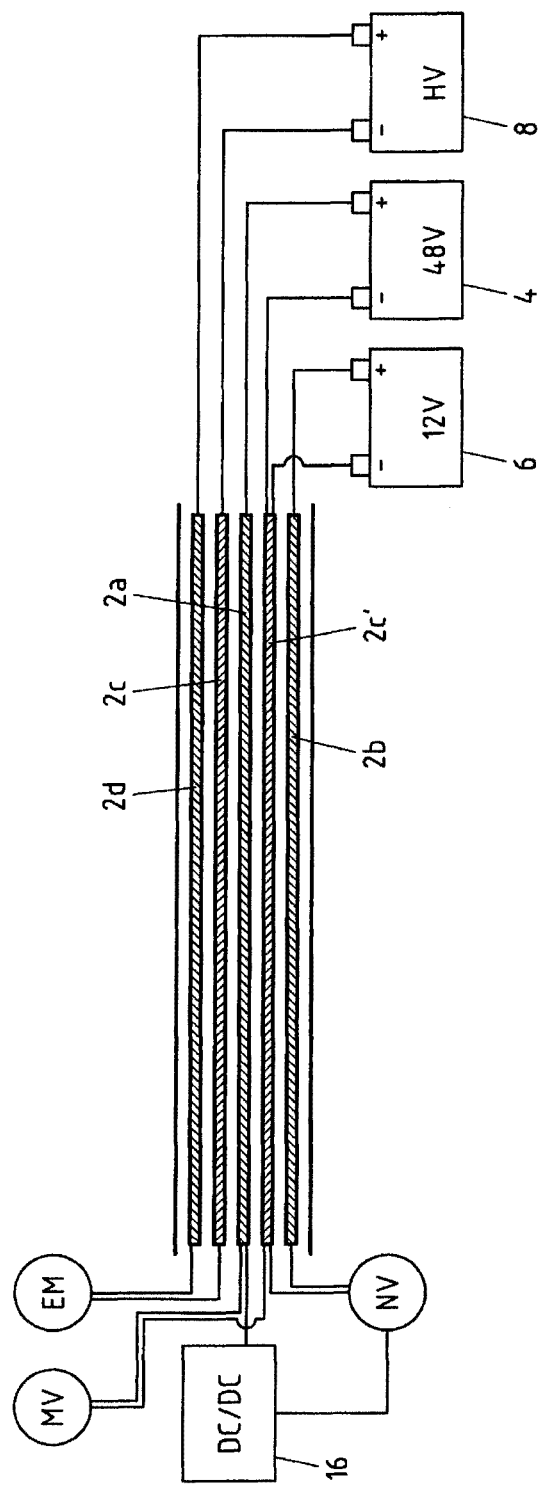

In the following, the subject matter is described in detail by means of drawings showing embodiments. In the drawings:

FIG. 1 shows a cross section of a multilayer cable with three flat cables according to a first exemplary embodiment FIG. 2 shows a cross section of a multilayer cable with three flat cables according to a second exemplary embodiment FIG. 3 shows a cross section of a multilayer cable with three flat cables according to a third exemplary embodiment FIG. 4 shows a cross section of a multilayer cable with three flat cables according to a fourth exemplary embodiment FIG. 5 shows a cross section of a multilayer cable with four flat cables according to a first exemplary embodiment FIG. 6 shows a cross section of a multilayer cable with four flat cables according to a second exemplary embodiment FIG. 7 shows a cross section of a multilayer cable with four flat cables according to a third exemplary embodiment FIG. 8 shows a cross section of a multilayer cable with four flat cables according to a fourth exemplary embodiment FIG. 9 shows a cross section of a multilayer cable with four flat cables according to a fifth exemplary embodiment FIG. 10 shows a cross section of a multilayer cable with four flat cables according to a sixth exemplary embodiment FIG. 11 shows a cross section of a multilayer cable with five flat cables according to a first exemplary embodiment FIG. 12 shows a cross section of a multilayer cable with five flat cables according to a second exemplary embodiment FIG. 13 shows a cross section of a multilayer cable with five flat cables according to a third exemplary embodiment FIG. 14 shows a cross section of a multilayer cable with five flat cables according to a fourth exemplary embodiment FIG. 15 shows a multi-voltage on-board electrical system for motor vehicles with two voltage sources FIG. 16 shows a multi-voltage on-board electrical system for motor vehicles with three voltage sources The figures show different exemplary embodiments of the represented multilayer cable and multi-voltage on-board electrical system for motor vehicles.

Where possible, in the figures the same reference numerals are used for the same elements.

FIG. 1 shows the cross section of a multilayer cable 1 with three flat cables 2a, 2b, 2c. The flat cables 2 are arranged substantially parallel to each other and separated from each other via an insulation 10 surrounding the flat cables 2. It is understood that according to another variant, round cables could be used instead of flat cables. Similarly, a combination of round and flat cables could also be provided. All configurations and applications described above and in the following in connection with flat cables naturally also apply, as far as applicable, to round cables.

FIG. 1 shows an embodiment of a multilayer cable 1 in which a higher potential difference or electrical voltage is tapped via the first flat cable 2a than via the second flat cable 2b. Preferably, an electrical voltage of 48 V is tapped via the first flat cable 2a, while an electrical voltage of 12 V is preferably tapped via the second flat cable 2b. The third flat cable 2c arranged between the first and second flat cable serves as a combined ground return. It has been recognised that the electromagnetic compatibility within the motor vehicle on-board electrical system can be considerably improved thanks to the particular arrangement of the ground return cable 2c between the respective flat cables 2a, 2b carrying electrical voltage. The improvement of the electromagnetic compatibility is based on the opposite current flow of the delimited flat cables 2, whereby the emitted magnetic fields of the individual flat cables 2a, 2b, 2c are partially removed and the magnetic coupling between these is significantly reduced.

The flat cables 2 are formed of an electrically conductive material, such as a copper material or an aluminium material.

Advantageously, the material of the flat cables 2 is adapted to their requirement. A copper material is preferably used in the field of electricity transmission where only a limited space is available and at the same time high operating temperatures are present and high mechanical requirements are placed on the material. An aluminium material is used anywhere in the field of electricity transmission where weight or cost savings should be made and at the same time there is sufficient space available. In a particularly advantageous embodiment of the multilayer cable 1 the first of the flat cables 2a—which should carry a high current—is preferably formed of a copper material, while a second and third of the flat cables 2b, 2c are formed of an aluminium material. Likewise, the two electrical voltage-tapping flat cables 2a, 2b could be formed of a copper material and only the ground return flat cable 2c would be formed of an aluminium material.

For a good electromagnetic coupling of the cable elements and a correspondingly optimised electromagnetic compatibility, a dense arrangement of the flat cables 2a-c one above the other is provided. However, in order to ensure sufficient insulation 10 between the flat cables 2a-c even with a large mechanical load and high potential differences, the layer thickness of the insulation material has a thickness of at least 0.2 mm, preferably of more than 1 mm. In particular, the layer thickness of the insulation material arranged between two flat cables 2a-c is variably adapted to the potential difference between these flat cables 2.

FIG. 2 shows the cross section of a multilayer cable 1 with three flat cables 2a, 2b, 2c in which the layer thickness of the insulation material arranged between two flat cables 2a-c is adapted to the electrical voltage between the flat cables 2a-c. This differentiates itself from the embodiment shown in FIG. 1 in that the layer thickness of the insulation material between the first flat cable 2a and the third flat cable 2c, corresponding to the greater electrical voltage between these flat cables 2a, c, is greater than the layer thickness of the insulation material between the second flat cable 2b and the third flat cable 2c.

Alternatively to the enlargement of the layer thickness of the insulation material between the flat cables 2a-c, FIG. 3 shows an enlargement of the cross section of the ground return flat cable 2c. Through the enlarged cross section of the ground return the galvanic coupling between the voltage levels connected via the ground return can be reduced, whereby the electromagnetic compatibility of the motor vehicle on-board electrical system is maintained despite a combined ground return.

FIG. 4 shows an embodiment of the multilayer cable 1 with three flat cables 2a-c in which instead of an enlarged cross section of the ground return flat cable 2c, the cross section of the first flat cable 2a is enlarged. This has the advantage of a greater current-carrying capacity, which is a useful embodiment, particularly with a flat cable that supplies motor vehicle consumers that need a lot of power in a short amount of time.

In FIGS. 5-9 embodiments of a multilayer cable 1 with four flat cables 2a-c' are shown.

FIG. 5 shows a multilayer cable 1 with four flat cables 2a, 2b, 2c, 2c'. A second flat cable 2b, which preferably carries an electrical voltage of 12 V, is arranged above a first of the ground return-serving flat cables 2c'. A further ground return-serving flat cable 2c is arranged above this, above which finally a first flat cable 2a is arranged, which preferably taps a potential difference of 48 V. Through the embodiment with two flat cables for ground return 2c, 2c' a separate ground return of the first and second flat cable 2a, b and thus a significant reduction of the galvanic coupling between the two voltage levels 2a, 2b is possible.

FIG. 6 shows a further embodiment for separate ground return. Instead of the alternating flat cable construction, here not just one, but two ground return flat cables 2c, 2c' are arranged between the two flat cables 2a, 2b carrying an electrical voltage. This arrangement provides the advantage that the flat cables 2a, 2b carrying an electrical voltage are even further apart, which further reduces the likelihood of a short circuit between the flat cables 2a, 2b. A short circuit between these two flat cables 2a, 2b can in case of different voltage levels lead to the destruction of electrical motor vehicle consumers designed for the lower voltage level.

FIG. 7 shows an embodiment of a multilayer cable 1 with four flat cables 2a, 2b, 2c, 2c' in which a potential difference of 12 V is preferably carried via the lowest flat cable 2b. A ground return-serving flat cable 2c' is arranged above the flat cable 2b. The flat cable 2a, which preferably carries an electrical voltage of 48 V, is arranged above this again, followed by a further ground return-serving flat cable 2c. In addition, each flat cable 2a-c' is further encased by an electromagnetic shield 12, which can be formed as a metal foil, a metal strip, a metal braid or a metal coating. The electromagnetic shield 12 shields the individual flat cables 2a-c' from each other and from the rest of the motor vehicle on-board electrical system, which leads to improved electromagnetic compatibility.

FIG. 8 shows the arrangement of a multilayer cable 1 as in FIG. 6, with the only difference being an enlarged cable cross section of the first flat cable 2a, which preferably carries an electrical voltage of 48 V. This has the advantage of a greater current-carrying capacity, which is a useful embodiment, particularly with a flat cable that supplies motor vehicle consumers that need a lot of power in a short amount of time.

FIG. 9 shows the cross section of a multilayer cable 1 with four flat cables 2a, 2b, 2c, 2c' corresponding to FIG. 5, with the only difference being that the layer thickness of the insulating material between the flat cables 2a and 2c, corresponding to the greater electrical potential difference, is designed to be greater than between the rest, which provides special protection from flashovers and arcs, which only burn in a stable manner at higher potential difference from 18 V. In addition to the greater distance between the flat cables 2a and 2c and the thicker insulation, the flat cable 2a is also encased by a shield 12, which should particularly improve the electromagnetic compatibility of the motor vehicle on-board electrical system. Alternatively, another or all of the flat cables 2a-c' could also be designed to be shielded.

FIG. 10 shows the cross section of a multilayer cable 1 in which, in addition to the flat cables 2a, 2c and 2b, three shielded data cables 14 are also provided. The carrying of the data cables 14 substantially eases the cabling requirements. The data cables 14 can be formed as twisted double-circuit cables, as coaxial cables or as fibre optic cables. Likewise, a combination is conceivable. Depending on the type of data cable 14 used, an additional electromagnetic shield 12 can also be dispensed with.

In FIGS. 11-14 embodiments of a multilayer cable 1 with five flat cables 2a, 2b, 2c, 2c', 2d are shown.

FIG. 11 shows an embodiment of a multilayer cable 1 with five flat cables 2a, 2b, 2c, 2c', 2d in which, in addition to a flat cable 2b preferably carrying an electrical voltage of 12 V and a flat cable 2a preferably tapping an electrical voltage of 48 V, a flat cable 2d preferably carrying an electrical high voltage is arranged. Thus, the lower arranged flat cable 2b is separated from the centrally arranged flat cable 2b by means of a ground return flat cable 2c. Likewise, the flat cable 2b is separated from the upper arranged flat cable 2a by means of a ground return flat cable 2c'. The additional implementation of a high voltage level in addition to a 12 V and a 48 V voltage level can preferably be useful in the field of motor vehicle on-board electrical systems of electric or hybrid vehicles. Here, the high voltage level can preferably be used for the supply of electric motors, while the voltage level of 12 V can ideally be used for voltage supply of vehicle consumers with a low power requirement. The voltage level of 48 V can then preferably further be used for the supply of vehicle consumers other than the electric motor that need a lot of power in a short amount of time.

FIG. 12 shows the same arrangement of a multilayer cable 1 with five flat cables 2a, 2b, 2c, 2c', 2d as FIG. 11, with the exception that the cross section of the flat cable 2a preferably carrying an electrical voltage of 48 V is enlarged. This has the advantage of a greater current-carrying capacity, which is a useful embodiment, particularly with a flat cable that supplies motor vehicle consumers that need a lot of power in a short amount of time.

FIG. 13 shows an arrangement of a multilayer cable 1 with five flat cables 2a, 2b, 2c, 2c', 2c". This is formed of three ground return flat cables 2c, 2c', 2c" and only two flat cables 2a, 2b carrying electrical voltage. Thus, both the flat cable 2b preferably carrying an electrical voltage of 12 V and the flat cable 2a preferably carrying an electrical voltage of 48 V are arranged between two of the ground return flat cables 2c, 2c', 2c". In this arrangement the ground is preferably returned separately. Thus, one of the flat cables 2a or 2b of choice can be connected in an electrically conductive manner to one or both neighbouring ground return flat cables 2c, 2c', 2c".

FIG. 14 shows the same arrangement of a multilayer cable 1 with five flat cables 2a, 2b, 2c, 2c', 2d as FIG. 11, with the exception that the cross section of the flat cable 2d preferably tapping an electrical high voltage is enlarged. This has the advantage of a greater current-carrying capacity, which is a useful embodiment, particularly with a flat cable that supplies an electric motor of electric or hybrid vehicles.

In FIG. 15 a multi-voltage on-board electrical system for motor vehicles with two voltage sources 4, 6 is shown. The two voltage sources 4, 6 are connected in an electrically conductive manner to three flat cables 2a, 2b, 2c carried in a multilayer cable 1. The first flat cable 2a is connected in an electrically conductive manner to the positive pole 4a of the first voltage source 4, the second flat cable 2b is connected in an electrically conductive manner to the positive pole 6a of the second voltage source 6 and the third flat cable 2c arranged between the first 2a and the second flat cable 2b is connected in an electrically conductive manner to the negative pole of the first 4b and second voltage sources 6b.

As shown in FIG. 15, an electrical voltage of 48 V can preferably be tapped via the first voltage source 4, while an electrical voltage of 12 V can preferably be tapped via the second voltage source 6. The first voltage source 4 is provided for the voltage supply of vehicle consumers that need a lot of power for a short amount of time (medium-voltage consumers (MV)), while the second voltage source 6 is preferably provided for the voltage supply of vehicle consumers with a low power requirement (low-voltage consumers (LV)). It should be noted that represented electrical consumers that are supplied with a DC voltage of more than 12 V up to and including 48 V are designated as medium-voltage consumers (MV). By contrast, represented electrical consumers that are supplied with a voltage of up to 12 V are designated as low-voltage consumers (LV).

The DC-DC converter 16, which is connected in an electrically conductive manner to the first voltage source, is an exception to the separated voltage supply. The 48 V DC voltage can be transformed into 12 V DC voltage by means of the DC-DC converter 16 and the electrical charge is subsequently also made available to the vehicle consumers of the 12 V voltage level.

In FIG. 16 a multi-voltage on-board electrical system for motor vehicles, in particular for electric or hybrid vehicles with three voltage sources 4, 6, 8 is shown. The three voltage sources 4, 6, 8 are connected in an electrically conductive manner to a total of five flat cables 2a, 2b, 2c, 2c' and 2d carried in a multilayer cable 1. The flat cable 2d is connected in an electrically conductive manner to the positive pole 8a of the voltage source 8, the flat cable 2a is connected in an electrically conductive manner to the positive pole 4a of the voltage source 4 and the flat cable 2b is connected in an electrically conductive manner to the positive pole 6b of the voltage source 6. In addition, the higher of the two ground return flat cables 2c is connected in an electrically conductive manner to the negative pole 8b of the voltage source 8, while the other flat cable designated with 2c' is connected in an electrically conductive manner to the both the negative pole 4b of the voltage source 4 and the negative pole 6b of the voltage source 6.

As shown in FIG. 16, electrical high voltage is can preferably be tapped via the voltage source 8, while an electrical voltage of 48 V can preferably be tapped via the voltage source 4 and an electrical voltage of 12 V can preferably be tapped via the voltage source 6. The voltage source 8 is thus preferably provided for the voltage supply of an electric motor (EM) and is provided with a separate ground return. By contrast, the voltage source 4 preferably serves as the voltage supply of further consumers that need a lot of power for a short amount of time (MV), while the voltage source 6 is preferably provided for the voltage supply of vehicle consumers with a low power requirement (LV). A DC-DC converter 16 is also provided in the multi-voltage on-board electrical system with three voltage sources 4, 6, 8. Here this is also connected in an electrically conductive manner to the voltage source 4 and can transform the 48 V DC voltage to 12 V DC voltage, whereby the electrical charge can also be made available to motor vehicle consumer of the 12 V voltage level.

The invention claimed is:

1. Multi-voltage on-board electrical system of a motor vehicle, comprising
at least three flat cables extending substantially in parallel with one another in the longitudinal direction thereof, and
at least two voltage sources,
wherein a first of the flat cables is connected in an electrically conductive manner to a first pole of a first of the voltage sources, a second of the flat cables is connected in an electrically conductive manner to a first pole of a second of the voltage sources, and a third of the flat cables is connected in an electrically conductive manner to a second pole of the first and second voltage source,
wherein
the third flat cable is arranged between at least the first and the second flat cable.

2. System of claim 1,
wherein
the first flat cable taps a higher electrical potential difference over the poles of the first voltage source than the second flat cable taps over the poles of the second voltage source, the first flat cable preferably tapping an electrical potential difference of 24 V, more preferably an electrical potential difference of 48 V, whereas the second flat cable preferably taps an electrical potential difference of 12 V.

3. System of claim 1,
wherein
in addition to the first flat cable, the second flat cable and the third flat cable, at least one additional flat cable which is connected in an electrically conductive manner to the first pole of a third voltage source, and/or one additional flat cable which is connected in an electrically conductive manner to the second pole of the first and/or second and/or third voltage source is arranged.

4. System of claim 1,
wherein
over the poles of the first voltage source, a different potential difference can be tapped to over the poles of the second voltage source and/or over the poles of the third voltage source, in particular in that over the poles of all three voltage sources, a different potential difference can be tapped.

5. System of claim 1 with a multilayer cable
wherein
at least one of the flat cables is formed at least in part from aluminium or an alloy thereof, and/or in that at least one of the flat cables is formed at least in part from copper or an alloy thereof.

6. System of claim 5,
wherein
at least one of the flat cables has a substantially rectangular cross section, wherein in particular edges and/or corners of the flat cables are rounded.

7. System of claim 5,
wherein
the distance between at least two of the flat cables is at least 0.2 mm, preferably more than 1 mm.

8. System of claim 5,
wherein
the current-carrying capacity of at least one of the flat cables is at least 50 A.

9. System of claim 5,
wherein
at least one of the flat cables has a greater cable cross section than at least two of the other flat cables.

10. System of claim 5,
wherein
an insulation surrounding the flat cables is formed from a flexible, bending-resistant insulation material, wherein the bending resistance thereof, in accordance with DIN EN ISO 178, is at least 20 MPa.

11. System of claim 5,
wherein
an insulation surrounding at least one of the flat cables is formed from a temperature-stable insulation material, wherein the permissible temperature range thereof extends from −10° C. to +80° C.

12. System of claim 5,
wherein
an insulation surrounding at least one of the flat cables is formed from a non-conductive insulation material, wherein the specific electrical conductivity thereof is at least less than $10^{-5}$ S·cm−1.

13. System of claim 5,
wherein
an insulation surrounding at least one of the flat cables is formed from a breakdown-resistant insulation material, wherein the breakdown resistance thereof is at least more than 5 kV/mm.

14. System of claim 5,
wherein
an insulation surrounding at least one of the flat cables is formed from an insulation material having a water absorbency within 24 hours at 23° C., in accordance with DIN EN ISO 62, of less than 0.07%.

15. System of claim 5,
wherein
an insulation surrounding at least one of the flat cables is formed from an insulation material having a tracking resistance of a CTI value of greater than 50 V.

16. System of claim 5,
wherein
at least one of the flat cables is additionally encased by a shield in the form of a metal foil, a metal strip, a metal braid or a metal coating.

17. System of claim 5, wherein the current-carrying capacity of at least one of the flat cables is at least 100 A.

18. System of claim 5, wherein an insulation surrounding the flat cables is formed from a flexible, bending-resistant insulation material, wherein the bending resistance thereof, in accordance with DIN EN ISO 178, is at least 60 MPa.

19. System of claim 5, wherein an insulation surrounding at least one of the flat cables is formed from a temperature-stable insulation material, wherein the permissible temperature range thereof extends from below −20° C. to over 120° C.

20. System of claim 5, wherein an insulation surrounding at least one of the flat cables is formed from a breakdown-resistant insulation material, wherein the breakdown resistance thereof is at least more than 50 kV/mm.

\* \* \* \* \*